United States Patent
Mansell (10) Patent No.: US 11,623,699 B2
(45) Date of Patent: Apr. 11, 2023

(54) ARTICULATING TRUCK BED PLATFORM

(71) Applicant: American Adventure Labs, LLC, Washington, UT (US)

(72) Inventor: Christopher Brit Mansell, Washington, UT (US)

(73) Assignee: AMERICAN ADVENTURE LABS, LLC, Washington, UT (US)

(*) Notice: Subject to any disclaimer, the term of this patent is extended or adjusted under 35 U.S.C. 154(b) by 198 days.

(21) Appl. No.: 17/089,556

(22) Filed: Nov. 4, 2020

(65) Prior Publication Data
US 2021/0129920 A1    May 6, 2021

Related U.S. Application Data

(60) Provisional application No. 62/930,011, filed on Nov. 4, 2019.

(51) Int. Cl.
*B62D 33/02*    (2006.01)
*B60P 3/34*    (2006.01)

(52) U.S. Cl.
CPC ............ *B62D 33/0207* (2013.01); *B60P 3/34* (2013.01)

(58) Field of Classification Search
CPC . B60R 9/042; B60R 9/00; B60R 9/045; B60P 1/003; B60P 1/025; B60P 3/34; B62D 33/0207
See application file for complete search history.

(56) References Cited

U.S. PATENT DOCUMENTS

| | | | | |
|---|---|---|---|---|
| 3,972,433 A | * | 8/1976 | Reed | B60P 3/1025 224/310 |
| 4,953,757 A | * | 9/1990 | Stevens | B60R 9/042 224/310 |
| 5,988,722 A | * | 11/1999 | Parri | B60P 1/003 224/403 |
| 6,883,849 B2 | * | 4/2005 | Hebert | B60P 1/003 224/403 |
| 7,159,917 B2 | * | 1/2007 | Haaberg | B60P 1/003 224/403 |
| 7,338,104 B1 | * | 3/2008 | Bejin | B62D 33/0273 224/403 |
| 8,240,527 B1 | * | 8/2012 | Casselton | B60R 9/065 224/404 |
| 9,016,750 B2 | * | 4/2015 | Izydorek | B60R 9/055 296/37.6 |

\* cited by examiner

*Primary Examiner* — Corey N Skurdal
(74) *Attorney, Agent, or Firm* — Dentons Durham Jones Pinegar; Sarah W. Matthews; James Larson (57) ABSTRACT

A system for an articulating truck bed platform may include an overhead rack slidably attached to an extendible horizontal platform. The platform may be rotatably connected to a distal beam such that it may be rotated clockwise and/or counterclockwise to level the platform. The proximal end of the platform may also be movable upwardly and/or downwardly.

19 Claims, 9 Drawing Sheets

ARTICULATING TRUCK BED PLATFORM

PRIORITY CLAIM AND CROSS REFERENCE TO RELATED APPLICATIONS

A claim for priority to the Nov. 4, 2019 filing date of U.S. Provisional Patent Application No. 62/930,011, titled Articulating Truck Bed Platform ("the '011 Provisional Application"), is hereby made pursuant to 35 U.S.C. § 119(e). The entire disclosure of the '011 Provisional Application is hereby incorporated herein.

TECHNICAL FIELD

This disclosure relates generally to supplementary fittings on vehicle exteriors for carrying load or mounting accessories. More specifically, the disclosure relates to a platform which may be used in conjunction with sleeping arrangements such as roof top tents.

BACKGROUND

Roof top tents may be a convenient way to use a tent while camping. Roof top tents typically allow users to sleep up off the ground, which may be uncomfortable and/or dangerous if there are predators on the ground. Roof top tents may also allow for quick and easy set-up of a tent compared to traditional tents.

However, there are some disadvantages to roof top tents. For example, the roof top tent typically must be placed at the very top of the truck or vehicle's bed, or on the roof of the vehicle, preventing other equipment from being stored above the roof top tent. Because of the placement at the top of the bed and/or roof of the vehicle, the tent may be very high when deployed, making it difficult to camp in areas with trees and also possibly leading to damage from tree limbs. A roof top tent may also make it difficult to drive in areas with low clearance, even when stowed, and negatively impact fuel economy. Because the roof top tent is mounted directly to the vehicle it is also important that the vehicle is level when camping to ensure the tent is also level. Leveling the vehicle may be difficult, especially given the rough terrain which is common when camping.

Thus, there is a need for an improved method of mounting and deploying roof top tents.

SUMMARY

This disclosure relates to an articulating platform system comprising: a rack in slidable connection with an extendible horizontal platform; the rack including: a first side of the rack reversibly fixed to a vehicle, a second side of the rack reversibly fixed to the vehicle, the second side opposite the first side; the extendible horizontal platform having a support frame with a first side, a second side, a proximal end and a distal end, the extendible horizontal platform including: a distal support beam having a first end and a second end, the distal end of the support frame rotatably connected to the distal support beam; wherein the extendable horizontal platform articulates about an axis that is non-parallel to a plane in which the extendable horizontal platform extends.

In other configurations, an overhead rack support in slidable connection with an extendible horizontal platform is disclosed; the overhead rack support including: a first side vertical bracket including a mounting flange for mounting the articulating platform system to a vehicle, a second side vertical bracket including a mounting flange for mounting the articulating platform system to a vehicle, the second side vertical bracket opposite the first side vertical bracket, a spreader beam extending from the first side vertical bracket to the second side vertical bracket and attached on a first end to the first side vertical bracket and attached on a second end to the second side vertical bracket, a first channel bracket in connection with the first side vertical bracket, and a second channel bracket in connection with the second side vertical bracket; the extendible horizontal platform having a support frame with a first side, a second side, a proximal end and a distal end, the extendible horizontal platform including: a distal support beam having a first end and a second end, the distal end of the support frame rotatably connected to the distal support beam; a first side roller bearing trolley in connection with the first end of the distal support beam and movable within the first channel bracket of the overhead rack support, a second side roller bearing trolley in connection with the second end of the distal support beam and movable within the second channel bracket of the overhead rack support, a first leg rotatably attached to the first side of the proximal end of the support frame, the first leg having a first, retracted horizontal position and a second, extended vertical position; and a second leg rotatably attached to the second side of the proximal end of the support frame, the second leg having a first, retracted horizontal position and a second, extended vertical position.

According to another aspect, the system may include a pivot in the distal support beam to pivot the proximal end of the extendible horizontal platform upwardly and downwardly with respect to the overhead rack support. The pivot may be selectively lockable. In some configurations, the distal end of the support frame is lockingly and rotatably connected to the distal support beam.

According to another aspect, the first and second legs are telescoping. In some configurations, the first and second legs are selectively extendable and/or lockable into the extended position. The system may include a locking mechanism to lock the first leg into at least one of the first, retracted horizontal position and the second, extended vertical position. The system may also include a locking mechanism to lock the distal support beam relative to the distal end of the support frame.

According to another aspect, an articulating platform system is described, which may comprise: an overhead rack support in slidable connection with an extendible horizontal platform; the overhead rack support including: a first side vertical bracket and a second side vertical bracket opposite the first side vertical bracket; a spreader beam extending from the first side vertical bracket to the second side vertical bracket; mounting means for mounting the first side vertical bracket and the second side vertical bracket to a vehicle; the extendible horizontal platform having a support frame with a proximal end and a distal end, the extendible horizontal platform including: a distal support beam having a first end and a second end, the distal end of the support frame rotatably connected to the distal support beam; means for slidably mounting the extendible horizontal platform to the overhead rack support; and at least one support leg retractably attached to the proximal end of the support frame.

According to one aspect, the means for slidably mounting the extendible horizontal platform to the overhead rack support comprises a first channel bracket in connection with the first side vertical bracket and a second channel bracket in connection with the second side vertical bracket, the extendible horizontal platform slidably engageable with the first and second channel brackets. In some configurations the first end of the distal support beam is slidably connected to the first channel bracket of the overhead rack support and the second end of the distal support beam is slidably connected to the second channel bracket of the overhead rack support.

These and other aspects are described below.

BRIEF DESCRIPTION OF THE DRAWINGS

The following drawings illustrate what are currently considered to be specific representative configurations for carrying out the disclosed subject matter and are not limiting as to embodiments which may be made in accordance with the present disclosed subject matter. The components in the drawings are not necessarily to scale relative to each other. Like reference numerals designate corresponding parts throughout the several views.

The drawings are illustrative and not limiting of the scope of the disclosed subject matter which is defined by the appended claims. The various elements of the disclosed subject matter accomplish various aspects and objects of the disclosed subject matter. Not every element of the disclosed subject matter can be clearly displayed in a single drawing, and as such not every drawing shows each element of the disclosed subject matter.

In the drawings.

DETAILED DESCRIPTION

The following provides a detailed description of particular embodiments of the present disclosed subject matter. Reference will now be made to the drawings in which the various elements of the illustrated configurations will be given numerical designations and in which the disclosed subject matter will be discussed so as to enable one skilled in the art to make and use the subject matter. It is to be understood that the following description is only exemplary of the principles of the present disclosed subject matter, and should not be viewed as narrowing the scope of the claims which follow, which claims define the full scope of the disclosed subject matter.

It will be appreciated that various aspects discussed in one drawing may be present and/or used in conjunction with the embodiment shown in another drawing, and each element shown in multiple drawings may be discussed only once. For example, in some cases, detailed description of well-known items or repeated description of substantially the same configurations may be omitted. The reason is to facilitate the understanding of those skilled in the art by avoiding the following description from being unnecessarily redundant. The accompanying drawings and the following description are provided in order for those skilled in the art to fully understand the present disclosure, and these are not intended to limit the gist disclosed in the scope of claims.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. All examples recited herein are principally intended expressly to be only for pedagogical purposes to aid the reader in understanding the principles of the disclosed subject matter and the concepts contributed by the inventor to furthering the art, and are to be construed as being without limitation to such specifically recited examples and conditions. All statements herein reciting principles, aspects, and embodiments of the disclosed subject matter, as well as specific examples thereof, are intended to encompass equivalents thereof.

Reference in the specification to "one configuration" "one embodiment," "a configuration" or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the disclosed subject matter to a single configuration, rather the element may be included in other or all configurations discussed herein.

Before the present disclosed subject matter is disclosed and described in detail, it should be understood that the present disclosure is not limited to any particular structures, process steps, or materials discussed or disclosed herein, but is extended to include equivalents thereof as would be recognized by those of ordinary skill in the relevant art. More specifically, the disclosed subject matter is defined by the terms set forth in the claims. It should also be understood that terminology contained herein is used for the purpose of describing particular aspects of the disclosed subject matter only and is not intended to limit the disclosed subject matter to the aspects or configurations shown unless expressly indicated as such. Likewise, the discussion of any particular aspect of the disclosed subject matter is not to be understood as a requirement that such aspect is required to be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a support beam" may include one or more of such support beams, and reference to "the locking mechanism" may include reference to one or more of such locking mechanisms.

As used herein, the term "about" is used to provide flexibility to a numerical range endpoint by providing that a given value may be "a little above" or "a little below" the endpoint while still accomplishing the function associated with the range. As used herein, a plurality of items, structural elements, compositional elements, and/or materials may be presented in a common list for convenience. However, these lists should be construed as though each member of the list is individually identified as a separate and unique member.

Figure 1:
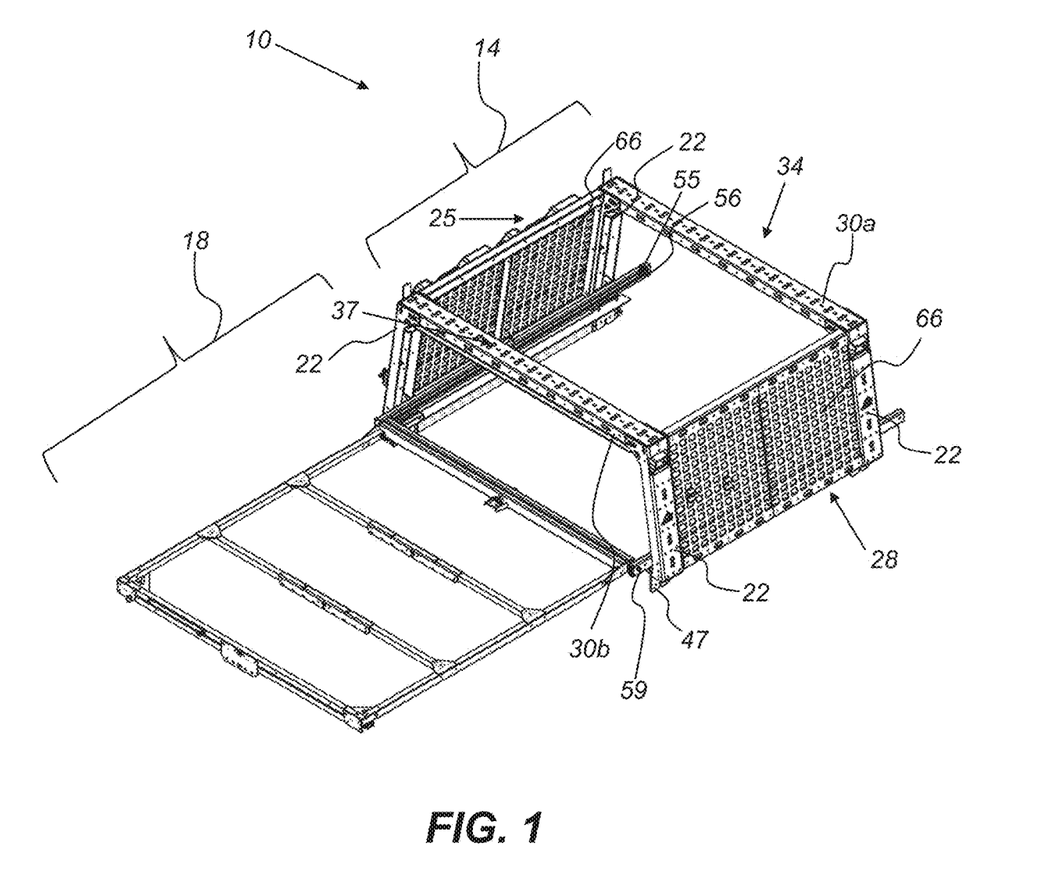
FIG. 1 is a perspective view of an articulating platform system as described herein.

This disclosure relates generally to one or more accessories for use with the bed of a vehicle. As described herein, the disclosure will reference use with a truck, but it will be appreciated that the principles of the invention may be applied to other vehicle beds, trailer beds, etc. FIG. 1 shows a perspective view of an exemplary articulating truck bed platform system as described herein, generally indicated at 10. The system 10 may generally include a rack support, which may be an overhead rack support, 14 and an extendible horizontal platform 18.

The overhead rack support 14 may include one or more vertical brackets 22. In the configuration shown in FIG. 1, the overhead rack support 14 includes a total of four support brackets, two on a first side 25 and two on a second side 28. In other configurations, fewer brackets may be used, such as one bracket on each side. In yet other configurations, more brackets may be used, such as three or more brackets on each side. In some configurations, the overhead rack support 14 may not be desired, so instead a rack with a first side attachable to a first side of the vehicle, and a second side attachable to the second side of a vehicle, may be provided for slidable connection with the extendible horizontal platform 18.

In configurations with an overhead rack support 14, the vertical brackets 22 maybe generally opposite each other on the first side 25 and second side 28, and attached to each other by one or more spreader beams 30. In the configuration shown in FIG. 1, a first spreader beam 30*a* is attached to the overhead rack distal end 34 and a second spreader beam 30*b* is attached to the overhead rack proximal end 37, each of the first and second spreader beams 30*a*, 30*b* extending from a first side 25 vertical bracket 22 to a second side 28 vertical bracket 22, or vice versa. The overhead rack support 14 may optionally include means for connecting and stowing additional equipment. For example, panels 66, or plates, may extend along a plane of the first side 25 and the second side 28 and between each of the vertical brackets 22. These panels 66 may be attached to the overhead rack support 14 for attaching gear, and holders may be attached to the panels for attaching items such as shovels, hatchets, gas cans, and other gear.

Figure 2:
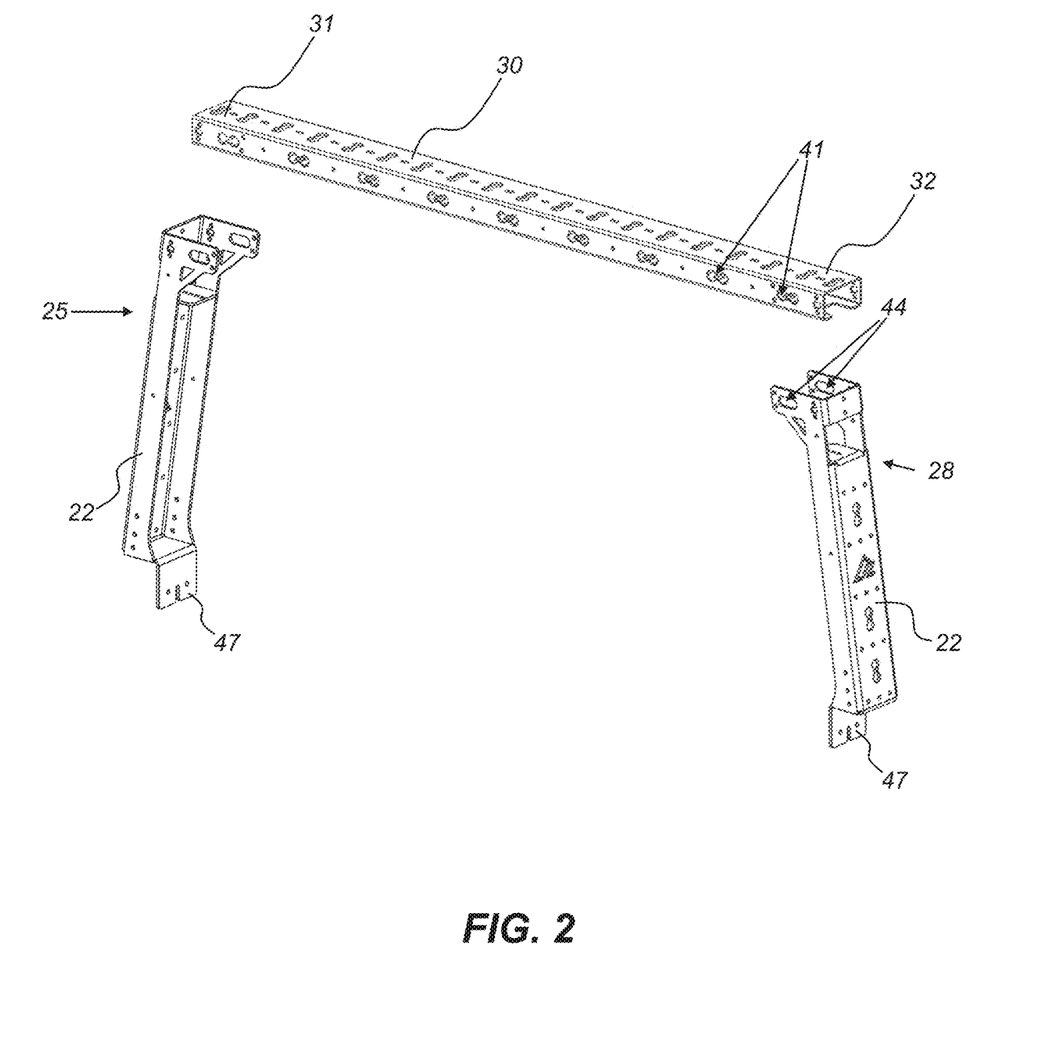
FIG. 2 is a partial exploded view of the vertical brackets and spreader beam of FIG. 1.

The spreader beam(s) 30 may be permanently or removably attached to the vertical brackets. For example, as shown in the exploded view of FIG. 2, the spreader beam 30 may be attached on a first end 31 to the first side 25 vertical bracket and on a second end 332 to the second side 28 vertical bracket. Each of the spreader beam(s) 30 and vertical bracket 22 may include one or more machined voids, such as voids 41 in the spreader beam 30 and voids 44 in the vertical brackets 22, to enable easy and secure connection of the spreader beam to the opposing vertical brackets. In other configurations, the spreader beam(s) 30 may be welded or otherwise permanently connected, or fixed, to the vertical brackets 22.

Figure 3:
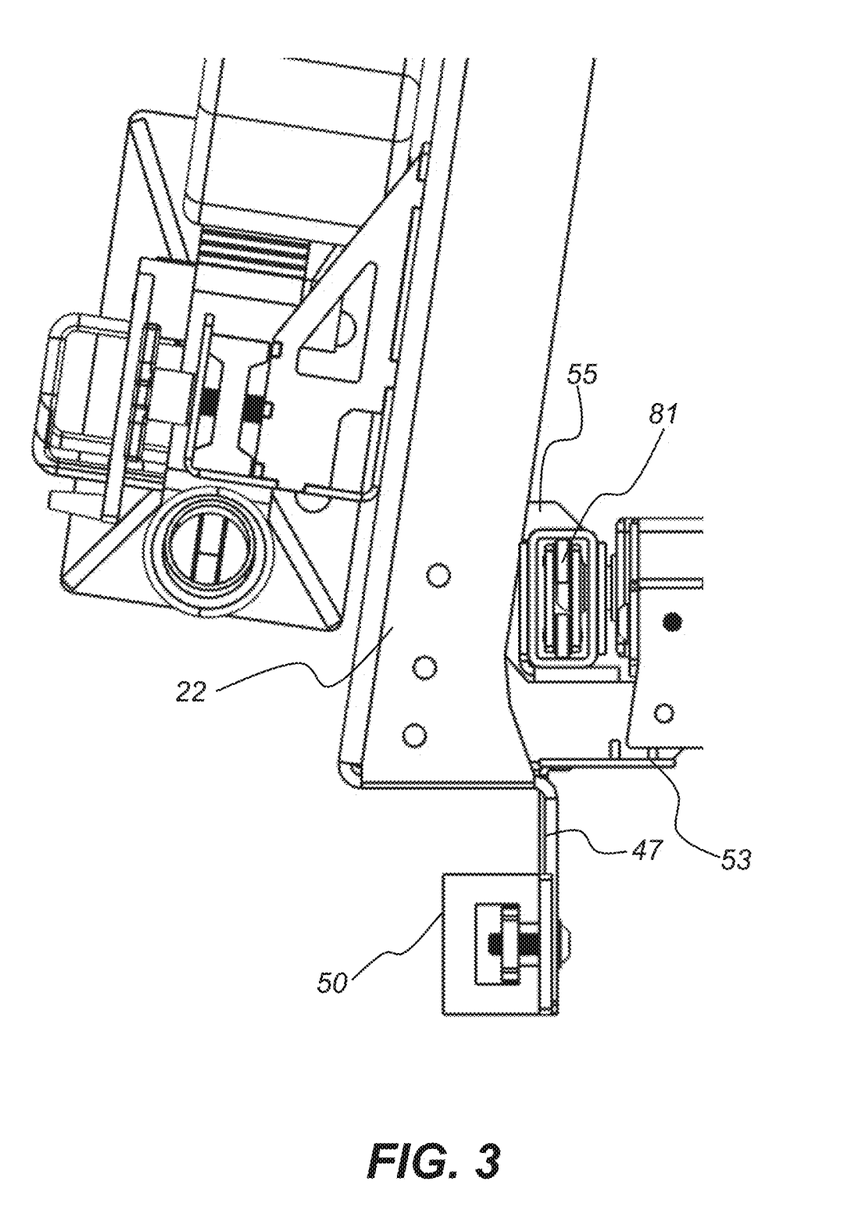
FIG. 3 is a detailed view of the first side of the articulating platform system of FIG. 1.

The overhead rack support 14 may be secured to a vehicle in any suitable manner. It may be secured at the roof of a vehicle, or it may be secured to the bed of a vehicle. For example, vertical brackets 22 may be mounted to the vehicle. In some configurations, the vertical brackets 22 may include a mounting flange 47 for connection to one or more mounting brackets to mount the overhead rack support 14 to the vehicle. For example, as shown in FIG. 3, the mounting flange 47 may be connected to a bed rail 50 (which may be the bed of a truck, or pick-up truck, bed), and/or a bed cover bracket 53 to secure the overhead rack support 14 to the bed of a vehicle, which may be a pick-up truck, or truck, or sport-utility vehicle (SUV).

The overhead rack support 14 may also include means for slidable connection with the extendible horizontal platform 18. In other configurations, an overhead rack support 14 may not be provided, and the rack for connection to a vehicle may include only a first side of the rack reversibly fixed to a vehicle, and a second side of the rack reversibly fixed to the vehicle, the second side opposite the first side. The extendible horizontal platform may then engage the first side and second side of the rack to slide from the retracted position to the extended position.

Figure 4:
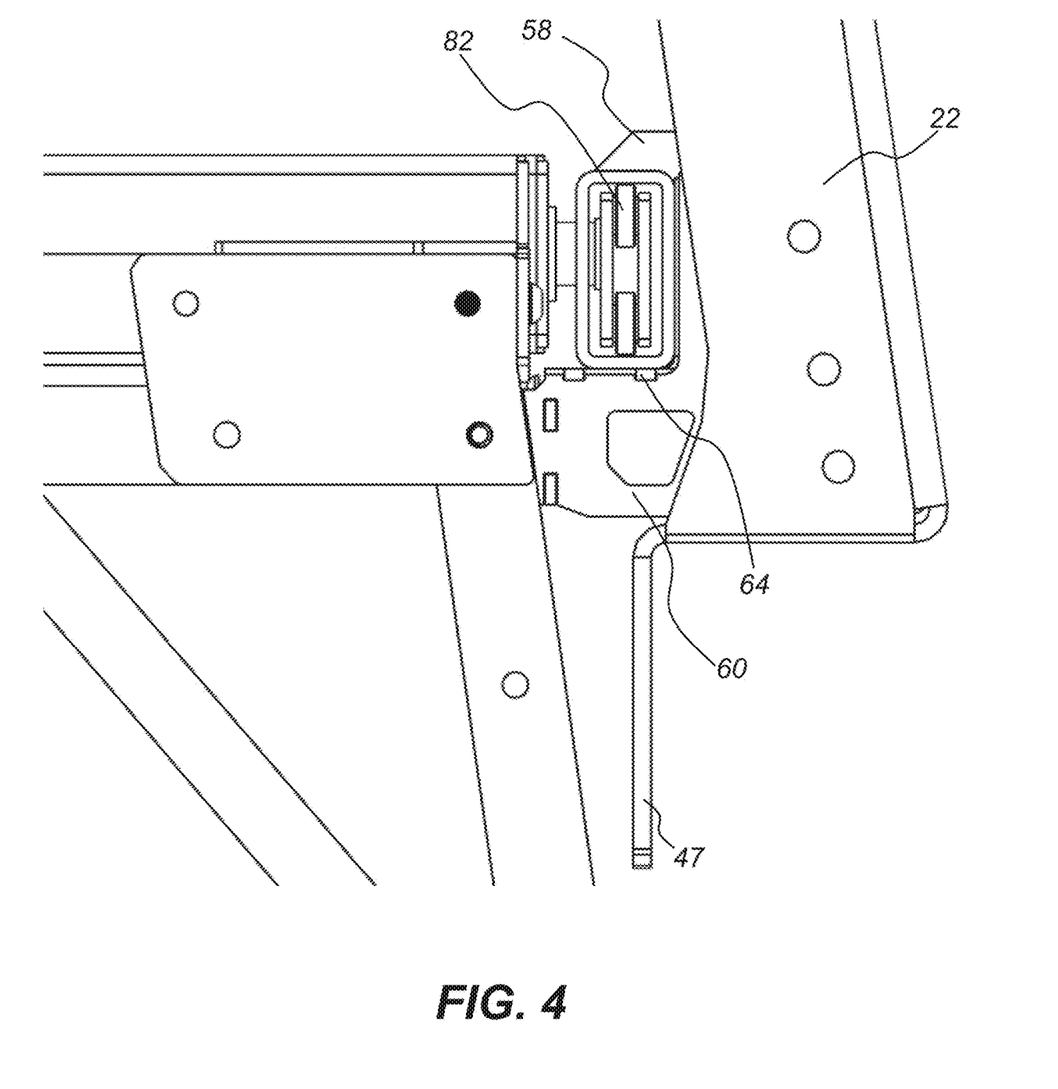
FIG. 4 is a detailed view of the second side of the articulating platform system of FIG. 1.
Figure 5:
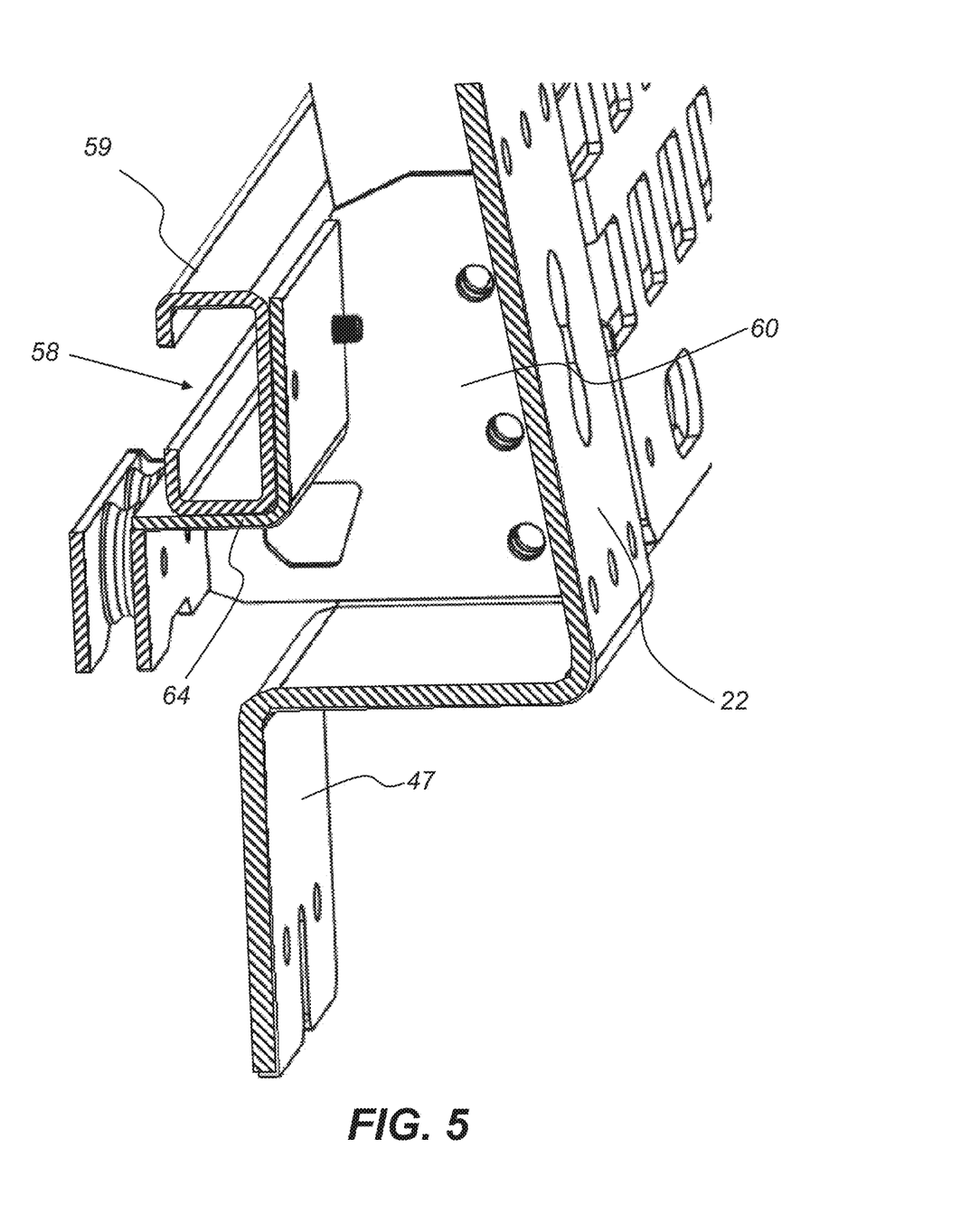
FIG. 5 is a cross-sectional view of the second side of the articulating platform system of FIG. 1.

Any suitable slidable or other movable connection means may be used to attach the extendible horizontal platform to the rack on the vehicle. In one configuration, a first channel 55 may be formed by a channel bracket 56 in connection with the first side 25, and a second channel 58 may be formed by a channel bracket 59 in connection with the second side 28. The extendible horizontal platform 18 may be able to slide within the channels 55, 58 to extend and retract. As seen in FIGS. 4-5, the channel 58 may be attached to the vertical bracket 22 via one or more channel support brackets. In this particular configuration, a vertical channel support bracket 60 is attached to the vertical bracket 22, and a horizontal channel support bracket 64 is attached to the vertical channel support bracket 60 and the channel bracket 59. Other configurations to attach the channels 55, 58 to the overhead rack support 14 may also be used. The channels 55, 58 may be installed at any vertical positioned desired. In one configuration, the channels 55, 58 are installed proximal to the bottom, to leave room above for a rooftop tent to be stowed.

Figure 6:
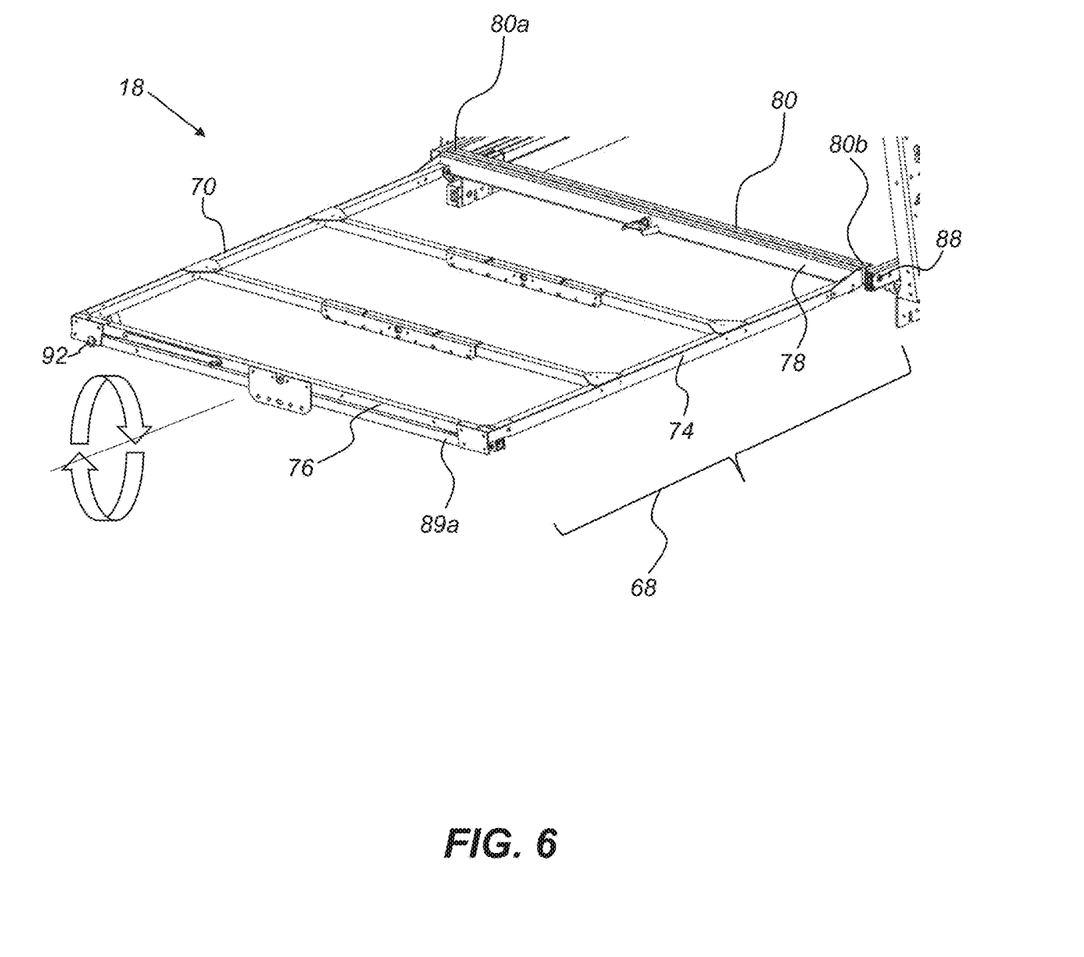
FIG. 6 is a top, perspective view of the extendible horizontal platform of FIG. 1 in an extended position.
Figure 7:
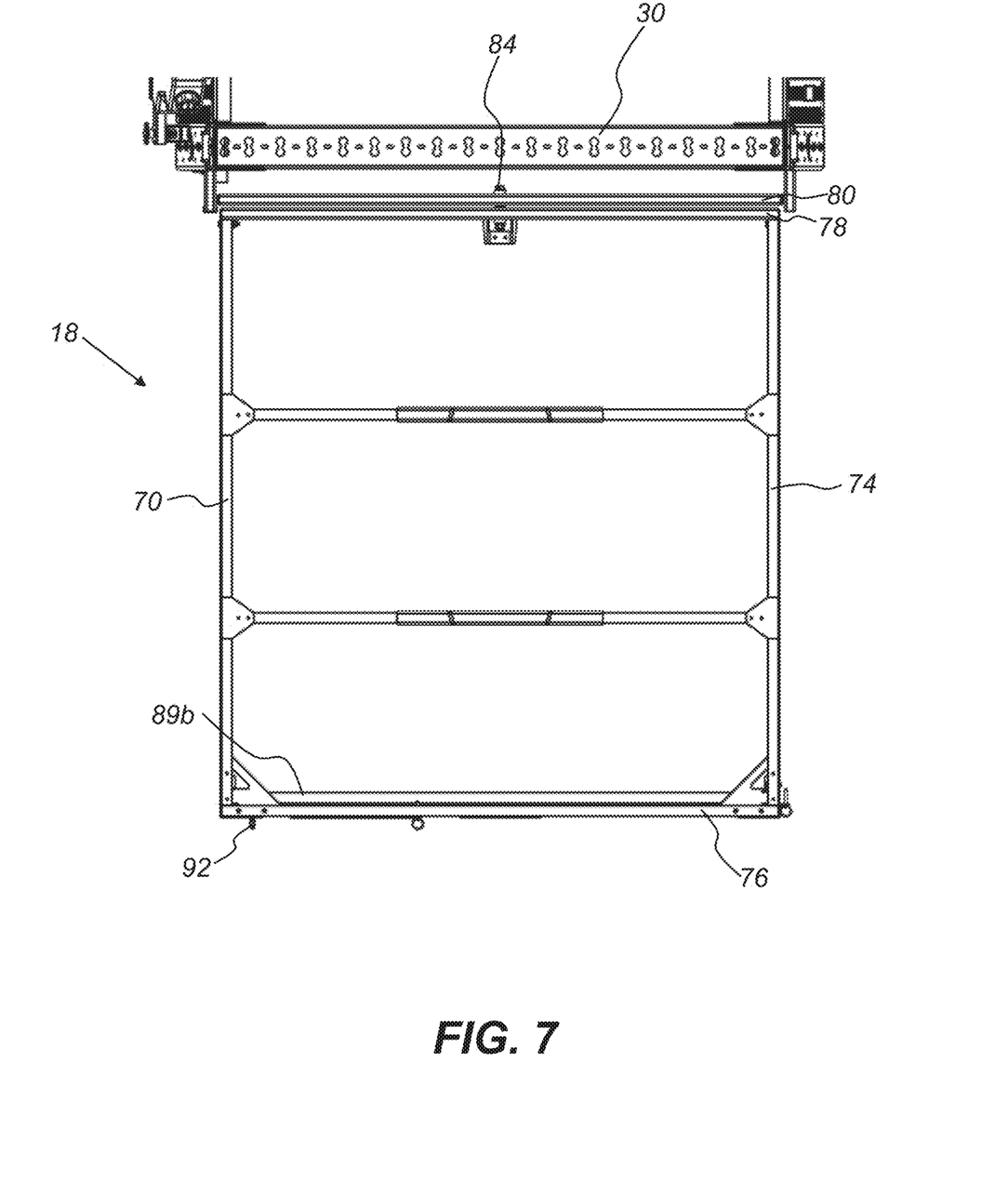
FIG. 7 is a top view of the extendible horizontal platform of FIG. 6.
Figure 8:
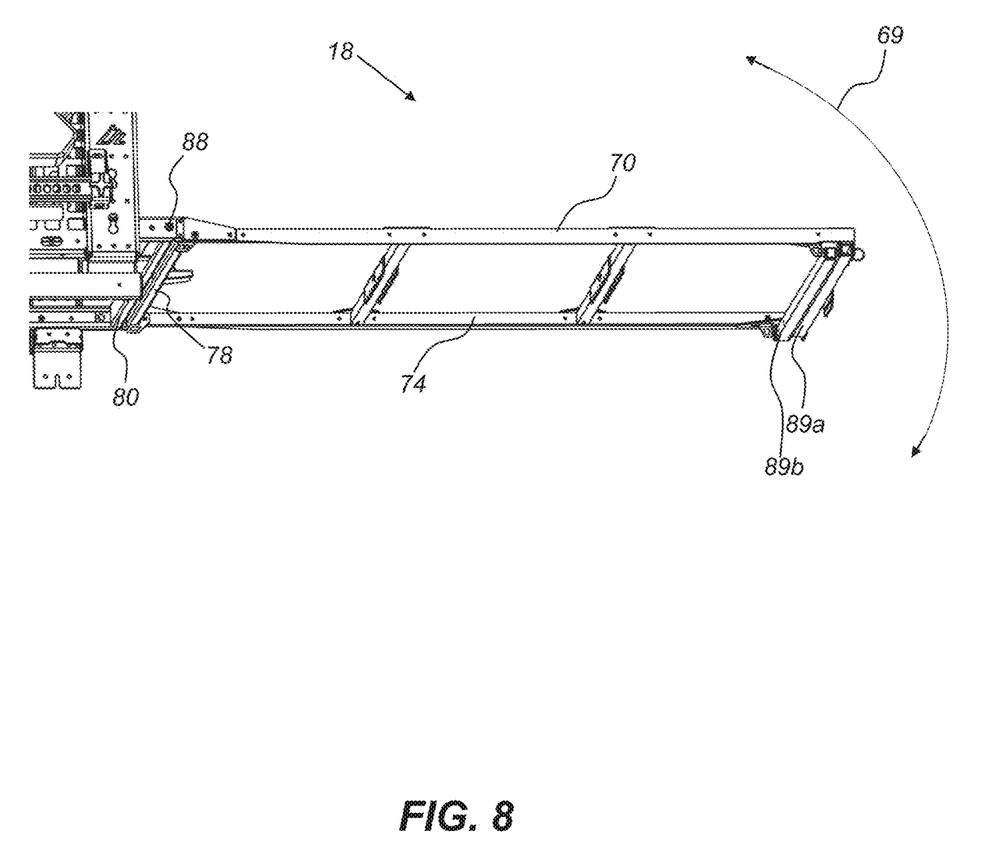
FIG. 8 is a bottom, perspective view of the extendible horizontal platform of FIG. 6.

Turning now to FIGS. 6-8, the extendible horizontal platform 18 of the articulating platform system 10 is shown. The extendible horizontal platform 18 may include a support frame 68 have a first side 70, a second side 74, a proximal end 76, and a distal end 78. The extendible horizontal platform 18 may be slidably connected in any suitable way to the overhead rack support 14. In the configuration shown in FIGS. 6-8, a distal support beam 80 may be connected on a first side 80*a* to a first side roller bearing trolley 81 (more easily visible in FIG. 3), and connected on a second side 80*b* to a second side roller bearing trolley 82 (second side roller bearing trolley 82 more visible in FIG. 4). The first side roller bearing trolley 81 may be receivable and slidably movable within the first channel 55 of the overhead rack support 14. The second side roller bearing trolley 82 may be receivable and slidably movable within the second channel 58 of the overhead rack support 14. Other connection means may also be used to slidably connect the extendible horizontal platform 18 to the overhead rack support 14, for example, the slide may not include rollers or trolleys at all and simply be frictionally fit within the first channel 55 and second channel 58 respectively and slide along those channels.

The distal end 78 of the support frame 68 may be rotatably connected to a distal support beam 80. This rotatable connection may allow the support frame 68 to move outwardly into the extended position, and then rotate (clockwise or counterclockwise, as desired) about a pivot 84 which extends through the distal support beam 80 and distal end 78. This pivot 84 may have a locked and an unlocked position to allow a user to rotate the support frame 68 to the desired position, and then lock the support frame 68 in place relative to the distal support beam 80. For example, the pivot 84 may have a locking mechanism at any of a plurality of locations, or it may have a ratchet system, etc. In some configurations, the pivot 84 may include a threaded bolt, and one or more nuts which may be tightened or loosened to allow the pivot to rotate. This rotational connection may allow a user to park their vehicle on ground which is not level, deploy their rooftop tent via the extendible horizontal platform 18 of the articulating platform system 10, and then rotate the support frame 68 until it is level. The pivot 84 may then be locked to secure the support frame 68 in a level position. In some configurations, a level may be provided attached to or integral to the proximal end 76, or on one of either the first side 70 or second side 74, to assist a user in leveling the support frame 68.

The proximal end of the support frame 68 may also be able to move upwardly and downwardly as indicated by arrow 69 in FIG. 8. This may be accomplished via one or more pivots 88 provided on the distal support beam. Similar to pivot 84, the pivots 88 may also be selectively locked and unlocked to ensure proper positioning of the extendible horizontal platform 18. The pivots 88 and 84 may pivot about the same axis. In some configurations, the support frame 68 may not be movable towards the first side 70 nor towards the second side 74. That is, while the distal end 76 may move up and/or down, and while it may rotate clockwise and/or counter-clockwise, it may not be movable to the left or to the right. This may provide added stability to the support frame 68 in the extended position. Similarly, the distal beam 80 may not be movable towards the first side nor towards the second side to provide added stability to the extendible horizontal platform 18.

The proximal end of the support frame 68 may also be provided with one or more support legs 89. The support legs 89 may have a retracted, horizontal position where they are nested within the support frame 68, and an extended, vertical position where they support the proximal end 76 of the support frame 68. For example, a first leg 89a may be rotatably attached to the first side 70 of the proximal end 76 of the support frame 68, the first leg 89a having a first, retracted horizontal position and a second, extended vertical position. A second leg 89b may be rotatably attached to the second side 74 of the proximal end 76 of the support frame 68, the second leg 89b similarly having a first, retracted horizontal position and a second, extended vertical position. In some configurations, the legs may be telescoping such that the length of the legs may be selectively adjusted based on the terrain. The legs may also be locked in the retracted position, for example, by the use of one or more locking pins 92.

In other configurations, additional legs may also be provided. For example, it may be desirable to take the vehicle out for a trip away from the camp side and be able to leave the horizontal platform at the camp site. A configuration with two additional retractable legs, similar to legs 89a, 89b, provided at the distal end of the 78 of the support frame 68, may allow the support frame 68 and extendible horizontal platform 18 to be fully supported without the need for connection to a vehicle. The two additional legs may also be directly connected to the distal support beam 80. The legs may be able to adjust to different heights to accommodate various terrains. In this configuration, the extendible horizontal platform 18 may be fully slid out, with the platform 18 coming free of any channels in the rack, and four or more legs used to fully support the platform 18.

Figure 9:
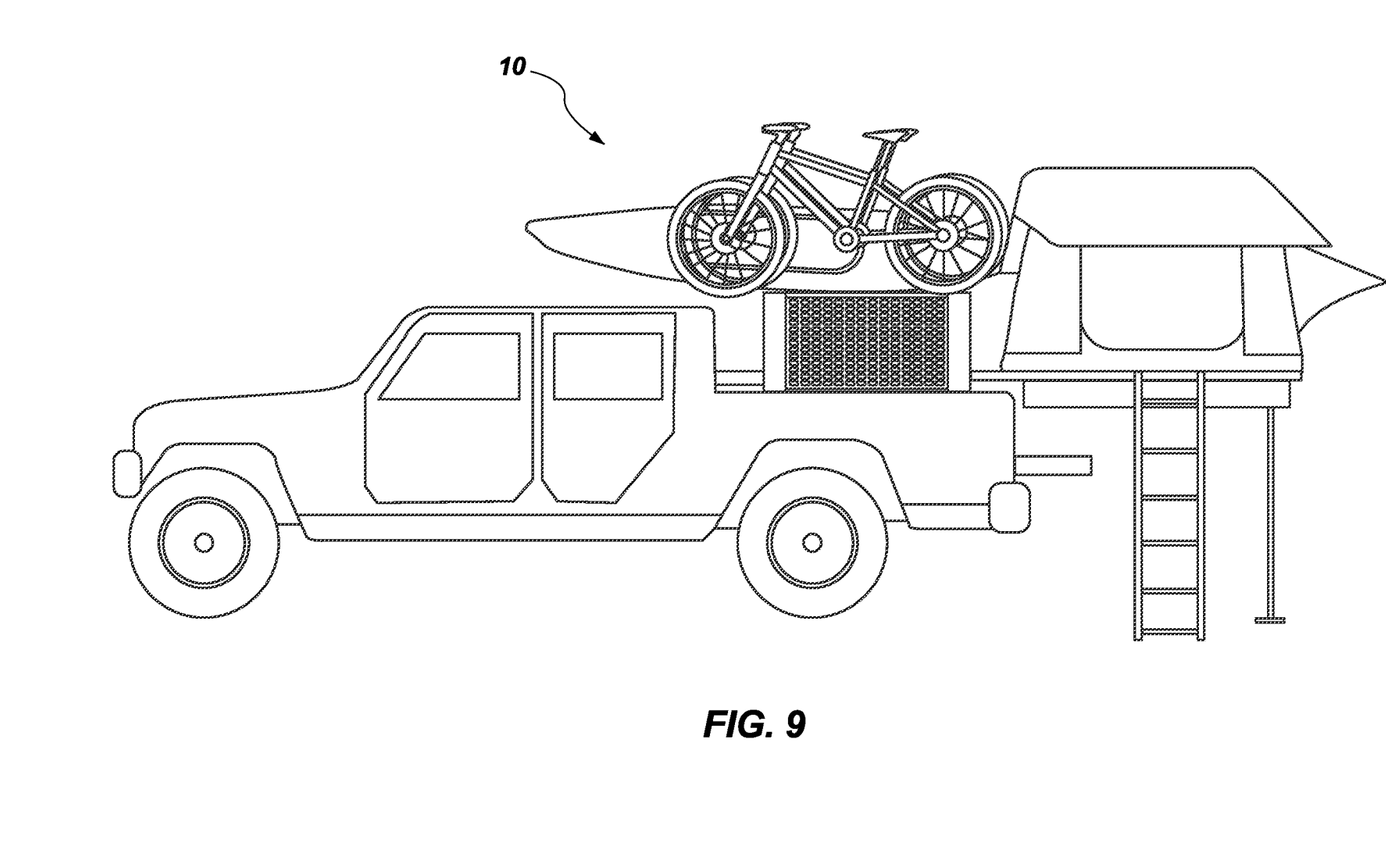
FIG. 9 is a side view of an articulating platform system deployed on a vehicle.

As seen in FIG. 9, the articulating platform system may be deployed on a vehicle, providing ample room below the platform system in the bed of the truck for storage, and additional storage on and above the overhead rack support 14.

Those skilled in the art can now appreciate from the foregoing description that the broad teachings of the present disclosure can be implemented in a variety of forms. Therefore, while the rack system set of the present disclosure has been described in connection with particular examples thereof, the true scope of the disclosure should not be so limited since other modifications will become apparent to the skilled practitioner upon a study of the drawings, specification and claims that follow.

What is claimed:

1. An articulating platform system comprising:
   an overhead rack support in slidable connection with an extendible horizontal platform; the overhead rack support including:
   a first side vertical bracket including a mounting flange for mounting the articulating platform system to a vehicle,
   a second side vertical bracket including a mounting flange for mounting the articulating platform system to the vehicle, the second side vertical bracket opposite the first side vertical bracket,
   a spreader beam extending from the first side vertical bracket to the second side vertical bracket and attached on a first end to the first side vertical bracket and attached on a second end to the second side vertical bracket,
   a first channel bracket in connection with the first side vertical bracket, and a second channel bracket in connection with the second side vertical bracket;
   the extendible horizontal platform having a support frame with a first side, a second side, a proximal end and a distal end, the extendible horizontal platform including:
   a distal support beam having a first end and a second end, the distal end of the support frame rotatably connected to the distal support beam;
   the first side of the support frame slidably mounted to the extendible horizontal platform to the overhead rack support.

2. The articulating platform system of claim 1, further comprising a first side roller bearing trolley in connection with the first end of the distal support beam and movable within the first channel bracket of the overhead rack support, and a second side roller bearing trolley in connection with the second end of the distal support beam and movable within the second channel bracket of the overhead rack support.

3. The articulating platform system of claim 1, further comprising a first leg rotatably attached to the first side of the proximal end of the support frame, the first leg having a first, retracted horizontal position and a second, extended vertical position; and a second leg rotatably attached to the second side of the proximal end of the support frame, the second leg having a first, retracted horizontal position and a second, extended vertical position.

4. The articulating platform system of claim 3, wherein the first and second legs are telescoping.

5. The articulating platform system of claim 3, wherein the first and second legs are selectively extendable.

6. The articulating platform system of claim 3, further comprising a locking mechanism to lock the first leg into at least one of the first, retracted horizontal position and the second, extended vertical position.

7. The articulating platform system of claim 1, further comprising a pivot in the distal support beam to pivot the proximal end of the extendible horizontal platform upwardly and downwardly with respect to the overhead rack support.

8. The articulating platform system of claim 7, wherein the pivot is selectively lockable.

9. The articulating platform system of claim 1, wherein the distal end of the support frame is lockingly and rotatably connected to the distal support beam.

10. The articulating platform system of claim 1, further comprising a locking mechanism to lock the distal support beam relative to the distal end of the support frame.

11. An articulating platform system comprising:
a rack support in slidable connection with an extendible horizontal platform; the rack support including:
  a first side channel and a second side channel;
  mounting means for mounting the first side channel and the second side channel to a vehicle;
the extendible horizontal platform having a support frame with a proximal end and a distal end, the extendible horizontal platform including:
  a distal support beam having a first end and a second end, the distal end of the support frame rotatably connected to the distal support beam;
  means for slidably mounting the extendible horizontal platform to the rack support; and
  at least one support leg retractably attached to the proximal end of the support frame.

12. The articulating platform system of claim 11, wherein the means for slidably mounting the extendible horizontal platform to the rack support comprises a first channel bracket in connection with a first side vertical bracket and a second channel bracket in connection with a second side vertical bracket, the extendible horizontal platform slidably engageable with the first and second channel brackets.

13. The articulating platform system of claim 12, wherein the first end of the distal support beam is slidably connected to the first channel bracket of the rack support and the second end of the distal support beam is slidably connected to the second channel bracket of the rack support.

14. A platform system comprising:
a rack in slidable connection with an extendible horizontal platform; the rack including:
  a first side of the rack reversibly fixed to a vehicle,
  a second side of the rack reversibly fixed to the vehicle, the second side opposite the first side;
the extendible horizontal platform having a support frame with a first side, a second side, a proximal end and a distal end, the extendible horizontal platform including:
  a distal support beam having a first end and a second end, the distal end of the support frame rotatably connected to the distal support beam;
  wherein the extendable horizontal platform articulates about an axis that is non-parallel to a plane in which the extendable horizontal platform extends.

15. The platform system of claim 14, the first side comprising:
  a vertical bracket positioned on the first side; and a mounting flange for mounting the platform system to the vehicle.

16. The platform system of claim 15 comprising: a first channel bracket in connection with the vertical bracket.

17. The platform system of claim 16 comprising: a second channel bracket in connection with the vertical bracket.

18. The platform system of claim 17 comprising a first side roller bearing trolley in connection with the first end of a distal support beam and movable within a first channel bracket of the rack, and a second side roller bearing trolley in connection with the second end of a distal support beam and movable within a second channel bracket of the rack.

19. The platform system of claim 14, the second side comprising: a vertical bracket positioned on the second side; and a mounting flange for mounting the platform system to the vehicle.

* * * * *